Oct. 11, 1949.　　　J. E. WHETSTINE　　　2,484,438
HAND OPERATED SAW FILING DEVICE
Filed March 1, 1948　　　　　　　　　　3 Sheets-Sheet 1

Jesse E. Whetstine
INVENTOR.

Oct. 11, 1949.  J. E. WHETSTINE  2,484,438
HAND OPERATED SAW FILING DEVICE
Filed March 1, 1948   3 Sheets-Sheet 2

Jesse E. Whetstine
INVENTOR.

BY *O'Brien and Harvey B. Jackson*
Attorneys

Oct. 11, 1949.  J. E. WHETSTINE  2,484,438
HAND OPERATED SAW FILING DEVICE
Filed March 1, 1948  3 Sheets-Sheet 3

Jesse E. Whetstine
INVENTOR.

Patented Oct. 11, 1949

2,484,438

UNITED STATES PATENT OFFICE 2,484,438

HAND-OPERATED SAW FILING DEVICE

Jesse E. Whetstine, Cedar Rapids, Iowa

Application March 1, 1948, Serial No. 12,341

6 Claims. (Cl. 76—35)

This invention relates to saw filing devices, and the primary object of the invention is to provide a simple and highly efficient device for use in manually filing hand saws and the like.

Another object is to provide a portable device of the above kind which may be readily mounted on the edge of a bench top or the like, and which includes a novel form of file carrier and mount therefor, whereby the angle at which the teeth are cut relative to the face of the saw blade may be readily adjusted.

Other objects are to provide novel means for manually feeding the saw relative to the file carrier to successively bring the teeth of the saw blade into operative relation to the file; to provide novel means for supporting and guiding the saw; to provide novel means for permitting engagement of the file with or disengagement of the same from the saw teeth; and to provide novel means for adjustably limiting the depth of cut made by the file.

The exact nature of the present invention, as well as other objects and features thereof, will become apparent from the following description when considered in connection with the accompanying drawings, in which—

Figure 1:
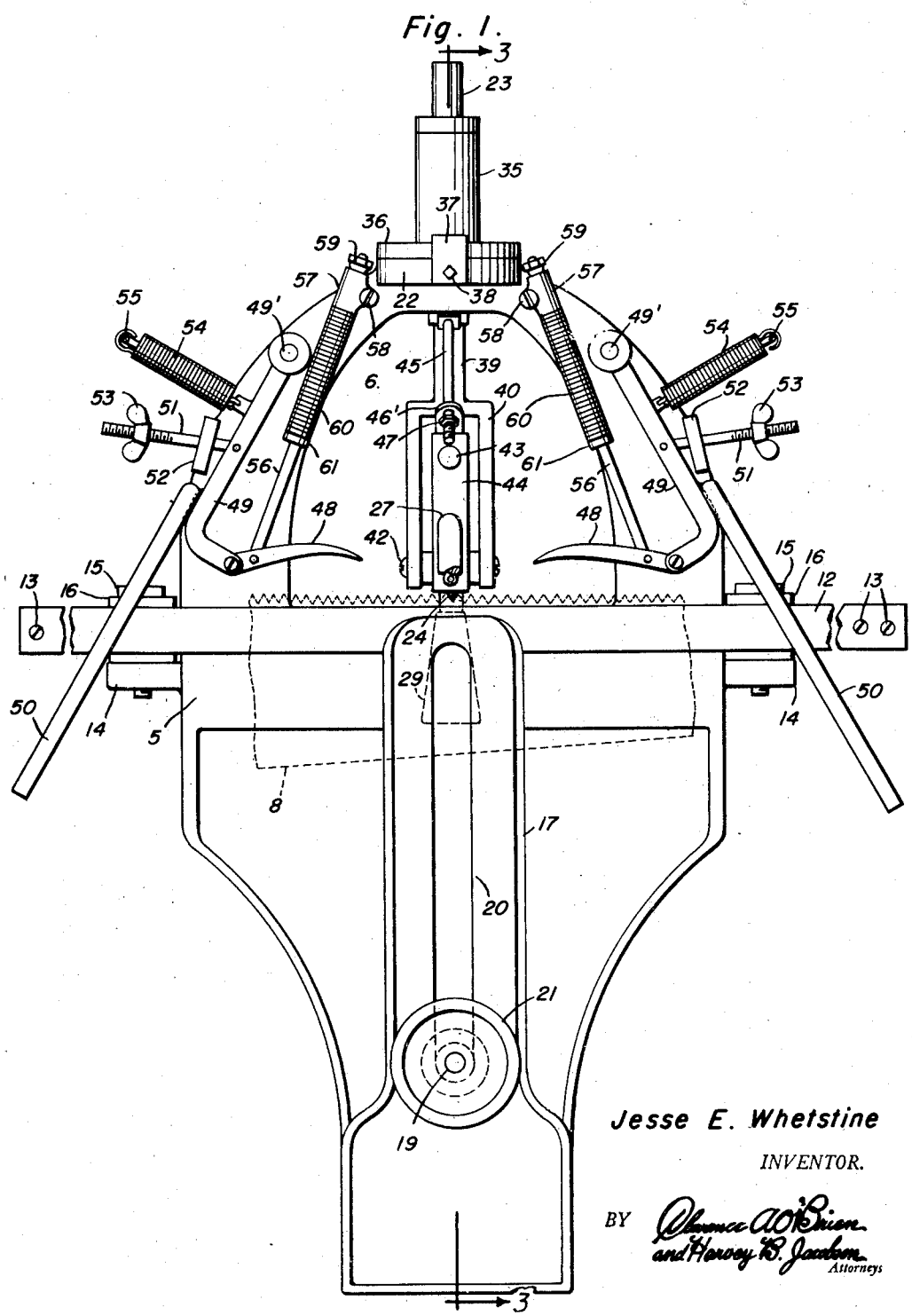
Figure 1 is a front elevational view, partly broken away, of a saw filing device constructed in accordance with the present invention.
Figure 2:
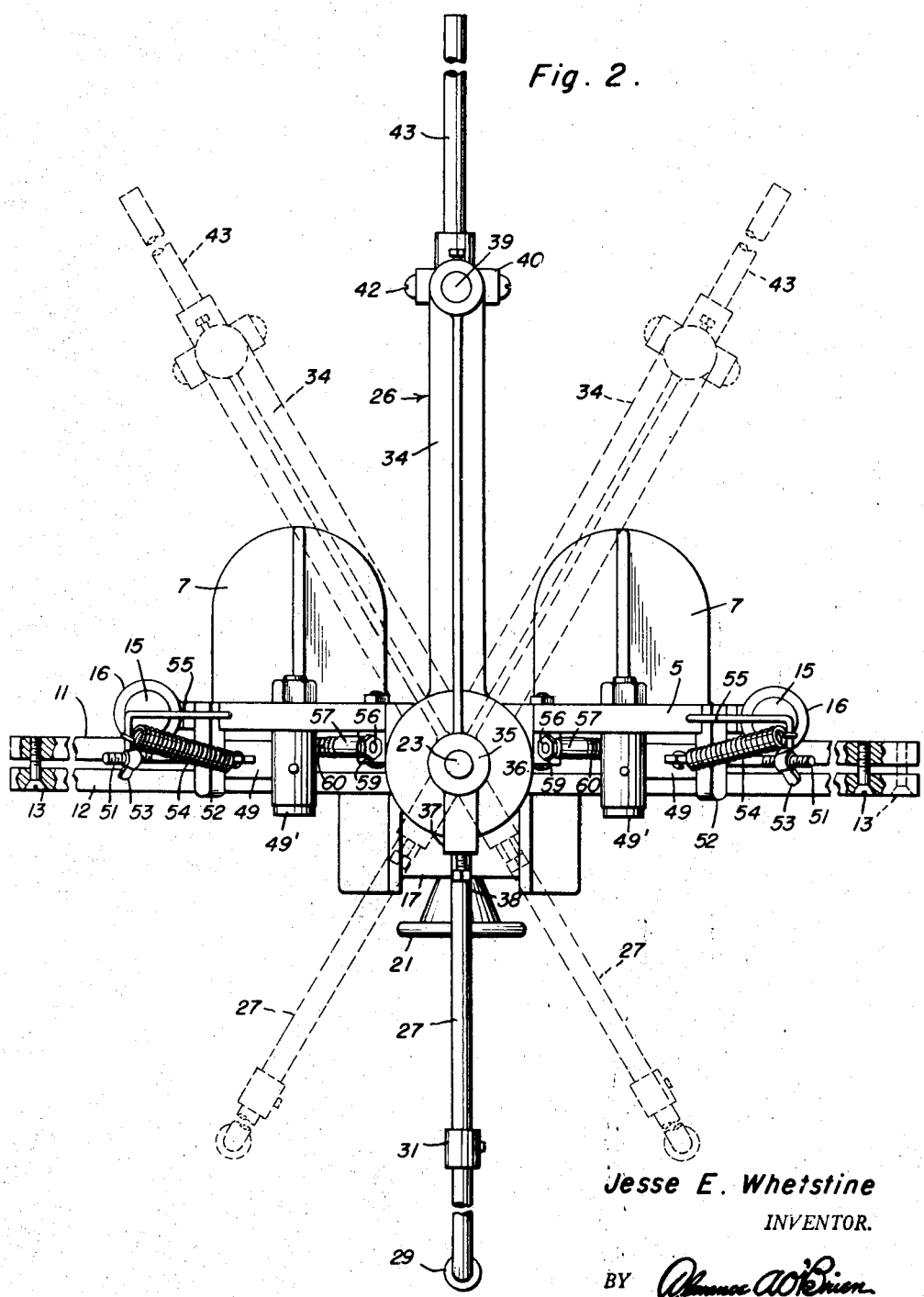
Figure 2 is a top plan view thereof.

Referring in detail to the drawings, the illustrated embodiment of the invention includes a plate 5 adapted to be fixed on a support in a vertical position and having a large opening 6 in its upper portion. Preferably, the lower portion of plate 5 has pairs of vertically spaced jaws 7 and 8 rigid with and projecting rearwardly from the lower portion thereof so that the edge portion of a bench top 9 or the like may be received therebetween, and the lower jaws 8 have clamping screws 10 threaded upwardly therethrough so that the bench top may be tightly gripped between the jaws 7 and screws 10 for rigidly mounting the plate 5 on the bench or the like.

The saw 8 is clamped between a pair of clamping bars 11 and 12 which are arranged adjacent and parallel with the toothed edge of the saw and are drawn together at their ends by screws 13. The plate 5 is provided at opposite sides with lugs 14 carrying upstanding vertical spindles 15 on which grooved guide rollers 16 are journaled. These rollers receive the bar 11 so as to support the saw parallel with and adjacent the front of plate 5 with the teeth of the saw slightly above the bottom of opening 6. The bar 11 is held in the grooves of rollers 16 by means of a loosely set jaw 17 whose lower end is hinged at 18 to the bottom of plate 5 and whose upper end is directed rearwardly in position to bear against the front side of bar 12 with insufficient friction to interfere with easy movement of the bars 11 and 12 and the saw 8 clamped therebetween. As shown, the plate 5 carries a bolt 18 that projects forwardly through a slot 20 in jaw 17 and has a nut 21 threaded thereon for setting said jaw.

The plate 5 is provided at the top and centrally between the sides thereof with a rigid horizontal bearing disc 22 provided with a central upstanding spindle 23.

For filing the teeth of the saw, an ordinary tree-sided file 24 is used, which file is mounted in a carrier 25 suspended by hanger 26 for horizontal reciprocation through the opening 6 in plate 5. The carrier includes an elongated rod 27 provided at its rear end with an upstanding arm 28 and at its front end with a depending handle 29. Fixed on the front portion of rod 27 are spaced depending arms 30 and 31 carrying sleeves 32 and 33 which removably receive and hold the ends of the file so that the latter is mounted parallel with and beneath said rod 27 for reciprocation with the latter.

The hanger 26 includes an arm 34 having a hub 35 at its forward end journaled on the spindle 23, and a disc 36 at the bottom of said hub which rests on the disc 22. The disc 36 has a depending marginal lug 37 which carries a set screw 38 adapted to be engaged with the periphery of disc 22 for securing the arm 34 in any angular position of adjustment thereof relative to said plate 5. Secured to and depending from the rear end of arm 34 is a stem 39 provided at its lower end with a yoke 40 in which a block 41 is pivoted at 42 for forward and rearward tilting movement. Secured to and projecting forwardly and rearwardly from the upper portion of block 41 is a guide rod 43 provided at its front end with a depending arm 44 located directly at the front of plate 5. The rear end portion of guide rod 43 slidably receives the arm 28 of the file carrier, and the rod 27 of the latter slides through the arm 44 of the hanger, whereby the file carrier is guided in its reciprocating movement. As the file carrier rod 27 and hanger guide rod 43 extend through the block 41, tilting of the latter allows the file carrier to be swung upwardly and downwardly to respectively disengage the file from the saw teeth and to engage it therewith. Downward swinging of the file carrier is adjustably limited to permit filing of the saw teeth to the proper depth, but not too deep. For this purpose, the rear end of a forwardly inclined rod 45 is pivoted at 46 to the stem 39 for vertical swinging movement, and this rod slidably extends through an ear 46' on the arm 44, a nut 47 being adjustably threaded on the rod 45 in front of ear 46' to coact with the latter and limit downward movement of the file carrier. As the hanger 26 and the file carrier 25 are angularly adjustable in unison, the angular adjustment of arm 34 provides for positioning the file at any one of various angles to the face of the saw so that the saw teeth may be cut at a corresponding angle.

Step by step feed movement may be imparted to the saw in either desired direction by selective manual actuation of one of a pair of reversely-acting pawls or dogs 48 pivoted to levers 49 which are hinged at 49' on the front of the plate 5 at opposite sides of the opening 6. Each lever 49 carries a depending handle 50. Pivoted to the intermediate portion of each lever 49 is a threaded stem 51 that loosely slidably extends outwardly through an ear 52 on the adjacent side of plate 5 and has a stop nut 53 adjustably threaded thereon outwardly of said ear, so as to coact with the latter for limiting each feeding movement of the associated pawl or dog 48 to a distance equal to one tooth of the saw being filed. Adjustment of said nut 53 adapts the device for saws having teeth of different sizes. The pawls or dogs 48 are adapted to engage the teeth of the saw to impart the feeding action to the saw, and they are yieldingly held in an inoperative position by means of helical tension springs 54, one of which is attached at one end to each lever 49 and at its other end to a bracket 55 projecting outwardly from the adjacent side of plate 5. Pivoted to each pawl or dog 48 inwardly of the adjacent lever 49 is a rod 56 which extends upwardly through a guide sleeve 57 pivoted at 58 to the top of plate 5 above and inwardly of the pivot of the associated lever 49. A stop nut 59 is provided on each rod 56 above the associated guide sleeve 57 so as to limit the downward swinging movement of the associated pawl or dog 48 to proper engagement with a tooth of the saw when the associated lever 49 is swung inwardly. A helical compression spring 60 surrounds each rod 56 between an abutment 61 on the latter and the associated sleeve 57 so as to yieldingly press the associated pawl or dog 48 into engagement with the saw tooth. Due to the relation of the rod 56 and lever 49 of each pawl or dog 48, said rod 56 is caused to yieldingly swing said pawl downwardly into engagement with the saw teeth when said lever is swung inwardly to a certain point, after which further inward movement of said lever effects the feeding movement of the saw.

Figure 3:
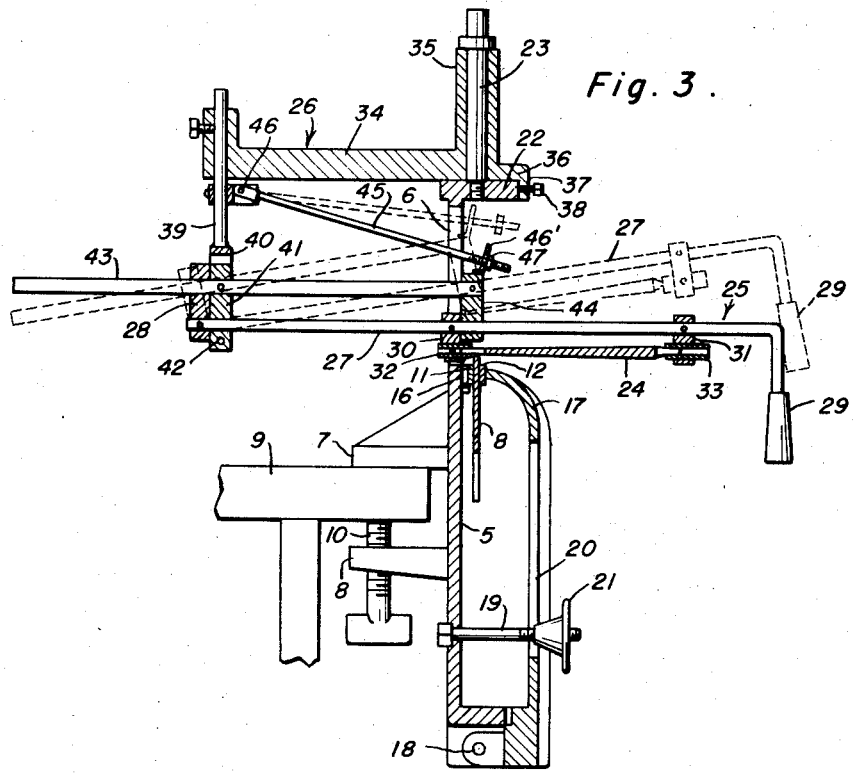
Figure 3 is a central vertical section taken on line 3—3 of Figure 1 and drawn on a reduced scale; and, Figure 4 is a view somewhat similar to Figure 3, showing the file carrier in a different position.
Figure 4:
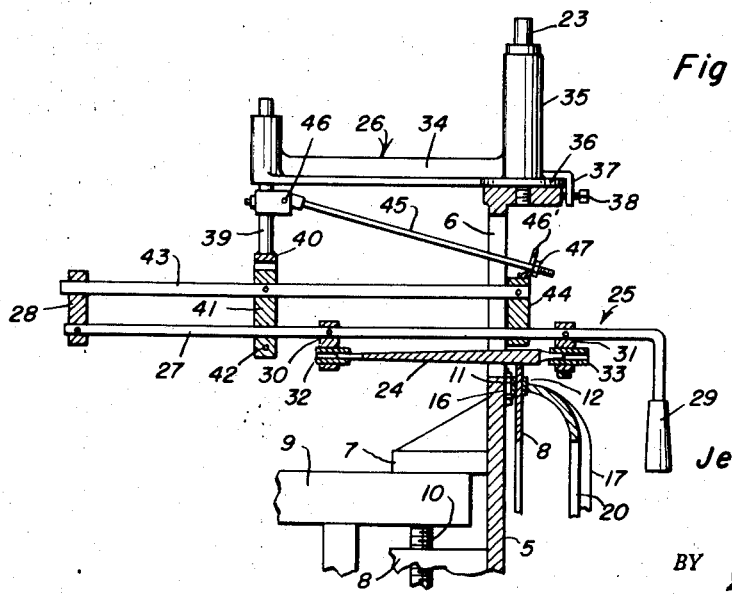

The operation of the device, summarized, is substantially as follows:

When the arm 34 is set at a right angle to the teeth of the saw, the file will cut the teeth at a right angle to the face of the saw, but when said arm 34 is set on one side or the other of the right angle position, the file will cut the teeth at an angle, and this angle, as is evident, may be varied, at will. The file 24 is moved endwise over the saw teeth by grasping the handle 29 and pushing the file carrier rearwardly. On the return stroke, the file is lifted to clear the teeth, and this cycle is repeated until the filing action on adjacent teeth is completed, the operator exerting the same downward pressure as commonly employed when filing a saw with the file held directly in the hand. The nut 47 is previously adjusted in accordance with the desired depth at which the particular saw is to be filed, and when the said nut contacts the ear 46', the operator will know that each filing operation has been completed. At the end of each filing operation, the file carrier is swung upwardly as indicated by dotted lines in Figure 3, whereupon the proper lever 49 is actuated to impart the necessary feeding movement to the saw by engagement of a pawl 48 with the saw teeth as previously explained. The broad idea of providing reversely-acting pawls is old and generally known in the art.

From the foregoing description, it is believed that the construction, operation and advantages of the present invention will be readily understood and appreciated by those skilled in the art. Modifications and changes in details of construction are contemplated, such as fall within the spirit and scope of the invention as claimed.

Having described the invention, what is claimed as new is:

1. In a saw filing device, a fixed vertical supporting plate having a relatively large opening in the upper portion thereof, said plate further having a rigid horizontal bearing disk at the top thereof provided with a central upstanding spindle, a hanger including an arm having a hub at its forward end journaled on said spindle and a disk at the bottom of said hub resting on said bearing disk whereby the hanger is mounted on the top of said plate for angular adjustment about a vertical axis in respect to the plane of said plate, a file carrier suspended by said hanger for reciprocation relative thereto through said opening, said file carrier being angularly adjustable with the hanger relative to the plate and having a handle at its front end, a saw holder carried by and mounted in front of said plate for horizontal movement relative to and parallel with the plane of said plate and in position to present the teeth of the saw to the file above the bottom of said opening, and manually operable means mounted on the front of said plate at one side of said opening and engageable with the teeth of the saw for imparting a step-by-step feed movement to the latter relative to the file.

2. The construction defined in claim 1, wherein said saw holder comprises a pair of clamping bars gripping the saw blade therebetween, in combination with grooved guide rollers mounted on opposite sides of said plate for rotation about vertical axes and having one of said bars received in the grooves thereof, and a loosely set jaw pivoted to the plate and engaged with the other bar to maintain the first named bar in the grooves of the rollers with insufficient friction to interfere with the movement of said bars when imparting feed movement to the saw.

3. The construction defined in claim 1, in combination with means carried by the disk of said arm and coacting with the periphery of said bearing disc to secure the arm in angularly adjusted positions.

4. The construction defined in claim 1, wherein said hanger further comprises a stem carried by and depending from the rear end of said arm and having a yoke on its lower end, a block pivoted in said yoke for forward and rearward tilting movement, a guide rod carried by and projecting forwardly and rearwardly from said block and having a depending arm at its forward end, said file carrier including a rod slidable in the last named arm and on the first named rod.

5. The construction defined in claim 1, wherein said hanger further comprises a stem carried by and depending from the rear end of said arm and having a yoke on its lower end, a block pivoted in said yoke for forward and rearward tilting movement, a guide rod carried by and projecting forwardly and rearwardly from said block and having a depending arm at its forward end, said file carrier including a rod slidable in the last named arm and on the first named rod, a forwardly inclined rod pivoted to said stem for vertical swinging movement, an ear carried by said last named arm and having the last named rod slidable therethrough, and an adjustable stop on the last named rod coacting with said ear for adjustably limiting downward swinging movement of the file carrier relative to the hanger as permitted by tilting of said block.

6. The construction defined in claim 1, wherein the means for imparting a step-by-step feed movement to the saw includes a depending hand lever pivoted on said plate and having a pawl pivoted thereto, a spring for swinging said lever in a direction away from the file carrier, adjustable stop means for limiting swinging movement of said lever toward the file carrier, a rod pivoted to the pawl and extending upwardly therefrom, a guide sleeve for the last named rod pivoted to the plate and having said last named rod extending upwardly therethrough, a stop member on the last named rod above said sleeve, and a helical compression spring on said last named rod acting to urge the pawl downwardly into engagement with the saw teeth in response to swinging movement of said lever toward the file carrier.

JESSE E. WHETSTINE.

REFERENCES CITED

The following references are of record in the file of this patent:

UNITED STATES PATENTS

| Number | Name | Date |
| --- | --- | --- |
| 424,724 | Penrose | Apr. 1, 1890 |
| 527,332 | Howard | Oct. 9, 1894 |
| 575,192 | Wilson | Jan. 12, 1897 |
| 648,932 | Duquemin | May 8, 1900 |
| 1,728,393 | Collier | Sept. 17, 1929 |
| 1,974,882 | St. Martin | Sept. 25, 1934 |
| 2,019,330 | Altman | Oct. 29, 1935 |
| 2,308,053 | Carlson | Jan. 12, 1943 |
| 2,343,171 | Collier | Feb. 29, 1944 |
| 2,441,786 | Zapart | May 18, 1948 |